United States Patent [19]

Binder et al.

[11] Patent Number: 4,555,065
[45] Date of Patent: Nov. 26, 1985

[54] CHOPPING ARRANGEMENT

[75] Inventors: Berthold Binder; Josef Pürrer, both of Gottmadingen, Fed. Rep. of Germany

[73] Assignee: Kloeckner-Humboldt-Deutz AG, Gottmadingen, Fed. Rep. of Germany

[21] Appl. No.: 613,347

[22] Filed: May 23, 1984

[30] Foreign Application Priority Data

May 24, 1983 [DE] Fed. Rep. of Germany ....... 3318752

[51] Int. Cl.⁴ .......................................... B02C 18/16
[52] U.S. Cl. .................................... 241/241; 241/286
[58] Field of Search ................ 241/101.7, 222, 241, 241/286, 221, 223, 224, 225, 287, 239, 240

[56] References Cited

U.S. PATENT DOCUMENTS 3,342,231  9/1967  Waldrop ........................ 241/241 X
4,295,616  10/1981 Hill .................................. 241/241
4,436,248  3/1984  Lindblom et al. ............. 241/241 X

FOREIGN PATENT DOCUMENTS 7143407  2/1972  Fed. Rep. of Germany.
2926538  8/1982  Fed. Rep. of Germany.

Primary Examiner—Mark Rosenbaum
Attorney, Agent, or Firm—Laurence R. Brown

[57] ABSTRACT

The invention relates to a chopping arrangement for a chopper and in particular a drum chopper having a chopping drum with several cutting blades spaced apart along its periphery which cooperate with a counter blade, the latter lying at each end against an anvil and being surrounded at each end by an essentially U-shaped clamp clip which presses the counter blade against the horizontal surface of the anvil under the effect of tension screws which penetrate the clamp clip and cooperate with tension nuts. The two arms of the clamp clip are extended by articulation pieces and the insides of the articulation pieces facing the anvil have a convex design and lie against the side walls of the anvil at only one point.

2 Claims, 2 Drawing Figures

CHOPPING ARRANGEMENT

TECHNICAL FIELD

The present invention relates to a chopping arrangement for a chopper, in particular a drum chopper having a chopping drum with several cutting blades spaced apart along its periphery which are attached to at least one rotating round anchor plate of the drum and cooperate with a counter blade having an adjustable position.

BACKGROUND ART

In such chopping arrangements, a stream of fodder is usually supplied via feed rollers to the rotating anchor plate of the drum which is provided with cutting blades normally arranged on a slant which chop the supplied fodder into small pieces with the counter blade fixed in the chopping arrangement. In order to allow for good chopping performance, it is necessary that the gap between the cutting blades and the counter blade has a constant value which is usually less than 1 mm; however, the gap between the cutting blades and the counter blade increases during the application of such a chopping arrangement due to the abrasion of the blades which comes about and their reduction due to regrinding, so that it is necessary to readjust the counter blade every now and then.

German Pat. No. 29 26 538 discloses an adjustable mounting for a counter blade which cooperates with the blade drum of a chopper. This mounting has a shifting element operated by an adjusting device for displacing the counter blade in the direction of feed towards the blade drum and which can be clamped together with the counter blade between clamping elements whose effective direction is aligned at right angles to the adjusting device of the counter blade. Between the adjusting device and the shifting element there is a lever pivoted around an axis parallel to the length of the counter blade, this lever, on the one hand, being acted upon by the adjusting device and, on the other hand, acting upon the shifting element so as to displace it in the direction of adjustment. The shifting element and the counter blade both remain clamped during adjustment between the clamping elements, whose clamping power is set to be smaller than the shifting power of the shifting elememt.

In this known adjustment arrangement, the clamping device and the adjusting device are thus independent of one another and must therefore be operated separately. Due to the adjusting lever used, a translational device to multiply its power is also required, so that the overall expenses are high.

Further, German Utility Model No. 71 43 407 discloses an adjustable mounting for the counter blade of a chopping arrangement, having a shifting element in the form of a concentric collar to displace the counter blade towards the blade drum, this collar being adjustable by means of a nut and the shifting element and the counter blade being capable of being clamped by means of a further screw which is clamped into the concentric collar by the nut. In order to release these screws for readjustment, parts of the machine housing must be removed, so that when the screws are released there is furthermore no more clamping effect for the counter blade.

The optimal functioning of the chopping arrangement thus requires that the distance between the blade and the counter blade be exactly maintained. Since each regrinding of the blades makes their path of rotation smaller, the counter blade must be readjusted until the blade gap has regained the proper width. If, as is usually the case, the counter blade attachment is designed in such a way that there is an adjusting screw and an attachment screw on each side, they must be tightened with a very high moment of torsion due to the high vibrating cutting forces and the great load on the attachment screws. Further, this is impeded in the case of conventional attachment arrangements by the poor accessibility resulting from the parts of the moving and driving gear surrounding the attachment area.

Furthermore, it is only possible to measure the blade gap accurately when the counter blade has reached its definitive posiion after all attachment screws have been tightened, so that it is necessary to repeat the troublesome adjustment process several times.

DISCLOSURE OF THE INVENTION

Assuming a chopping arrangement for a chopper of the type specified at the outset, this problem is solved by the following measures: the counter blade lies at each end against a stationary anvil, it is surrounded at each end by an essentially U-shaped clamp clip which presses it against the horizontal surface of the anvil under the effect of a tension screw penetrating the clip and cooperating with a tension nut, the two arms of the clamp clip are extended by articulation pieces and the insides of the articulation pieces facing the anvil are convex and lie against the side walls of the anvil at only one point, so that vertical displacement of one arm of the clamp clip causes a corresponding, essentially horizontal displacement of the counter blade.

It is advantageous for the tension screws to be inserted from below into the middle of the two articulation pieces and the arms of the clamp clip, and for the tension nuts to be inserted in the middle from above and extend upwardly far enough so as to be accessible from above by means of a box wrench.

The invention provides for the advantage that it is much easier to adjust the counter blade. Using an extended box wrench, the tension screws can be easily readjusted from above without any parts of the chopper jacket having to be removed. By tightening the tension screws and tension nuts to different degrees, the clamp clips assume a somewhat slanted position, thus displacing the counter blade in an essentially horizontal direction. The readjustment of the counter blade is carried out in a particularly simple manner by merely loosening to a certain extent the tension screw located in the desired direction of adjustment and tightening the second screw to the same extent. Due to the division of the tension force between two screws, the clamping torque is reduced to an easily manageable degree.

BRIEF DESCRIPTION OF THE DRAWINGS

In the following, the invention shall be described in more detail with reference to the drawings which show an advantageous embodiment.

THE PREFERRED EMBODIMENT

Figure 1:
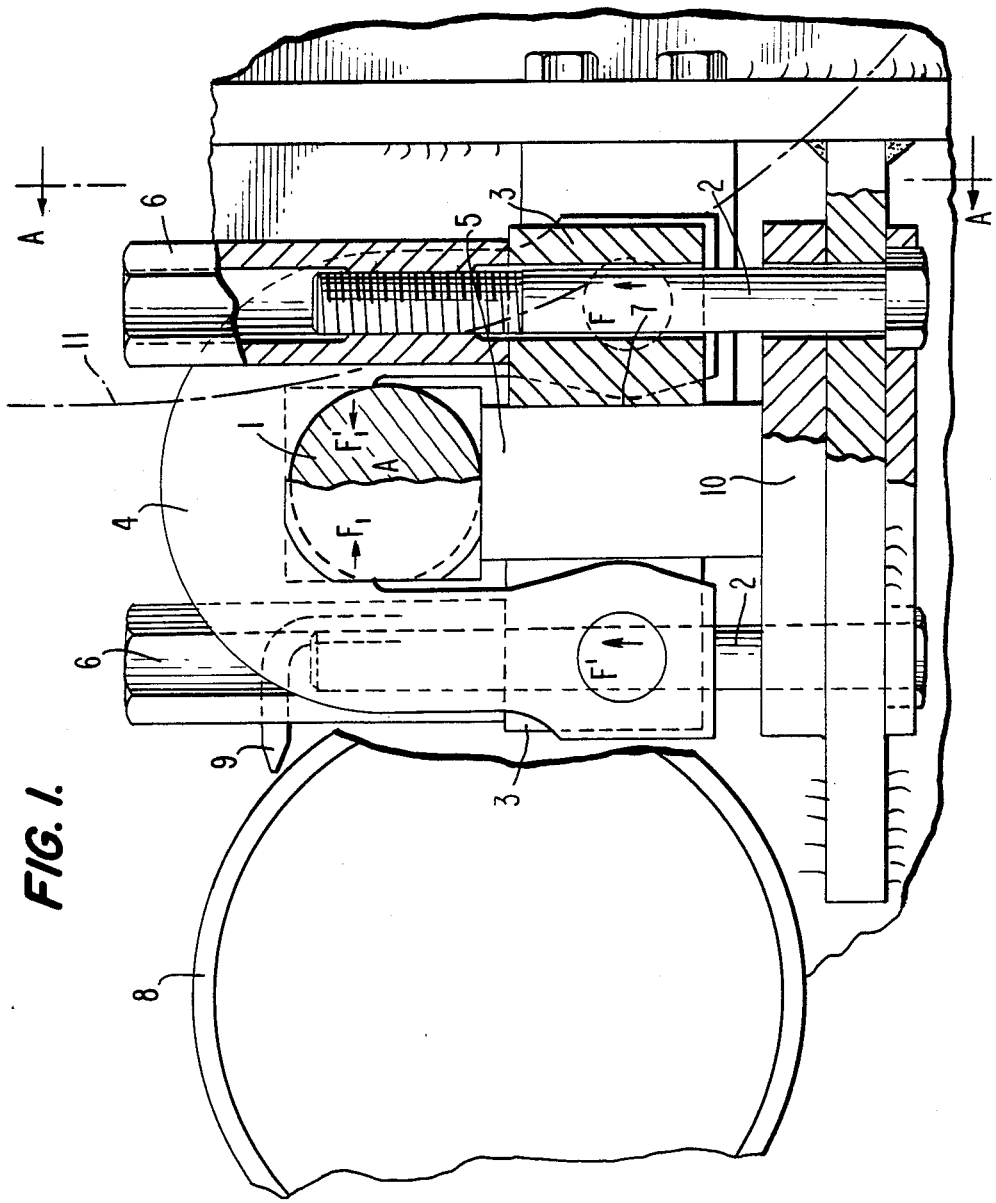
FIG. 1 a cross-section of a chopping arrangement in the direction of the counter blade FIG. 2 a view, cross-sectional in part, of a mounting for the counter blade, from the front.
Figure 2:
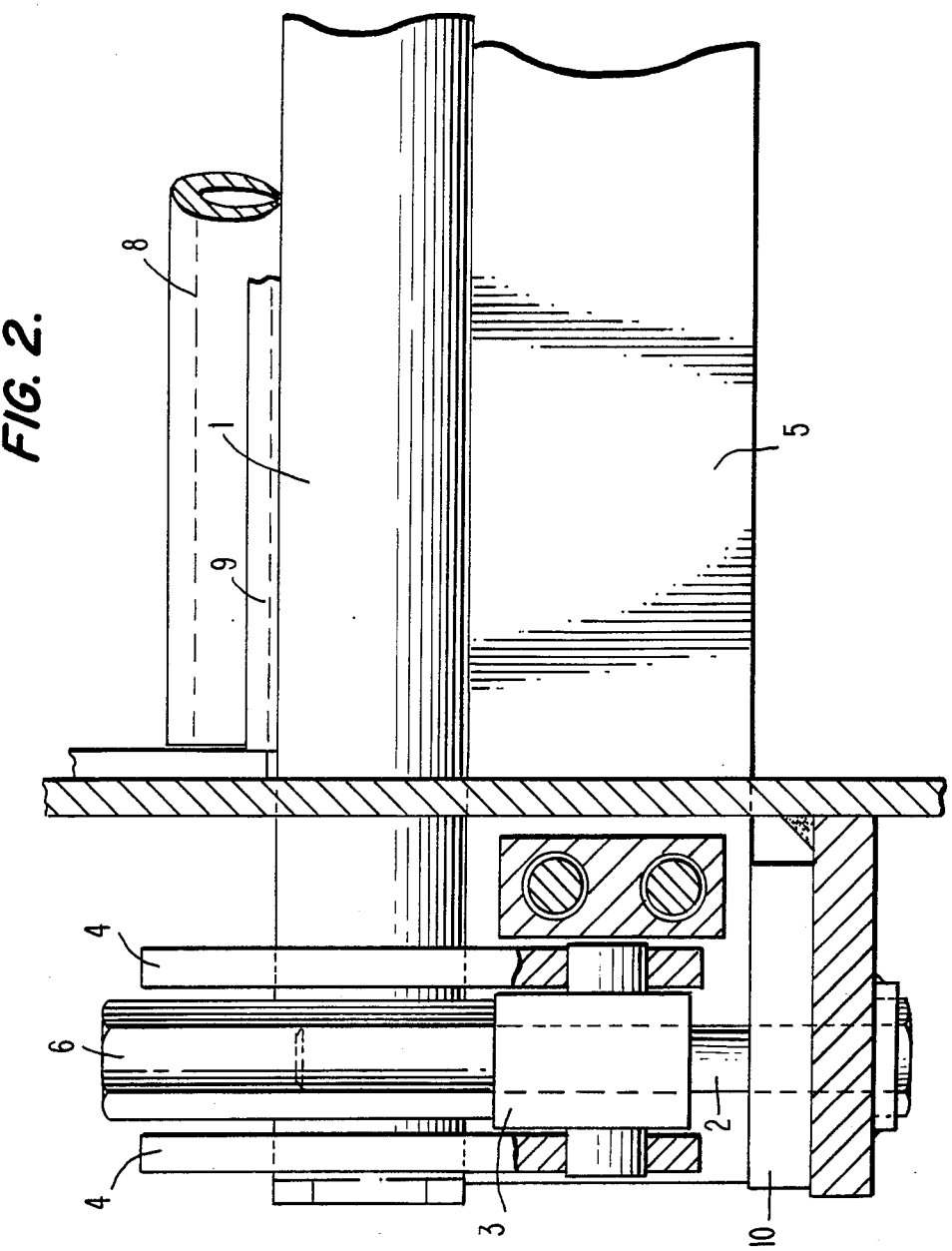

In the figures, number 1 refers to a counter blade which cooperates with path of rotation 11 of the cutting blades of a drum anchor plate not shown, in such a way that the fodder fed to the chopping arrangement by a feed roller 8 and a cleaner 9 can be chopped. In order that the blade gap between counter blade 1 and path of rotation 11 of the cutting blades can be adjusted as required, counter blade 1 must be capable of carrying out an essentially horizontal displacement. For this purpose counter blade 1 is inventively mounted on an anvil 5 firmly connected to to the framework by a carrier 10, the blade being attached, more specifically, to its upper horizontal surface. At both ends of counter blade 1 there are essentially U-shaped clamp clips 4 which surround both counter blade 1 and anvil 5, and are firmly connected to a carrier 10 of the machine housing in such a way that counter blade 1 is pressed onto anvil 5. The two arms of clamp clip 4 are extended by articulation pieces 3 at their lower ends, the insides of articulation pieces 3 having a convex design and lying free of play against the anvil at one point 7. Each arm of clamp clip 4 as well as the articulation pieces are penetrated by tension screws 2 which are inserted into the arms and articulation pieces from below and penetrate them through the middle. Tension nuts are inserted from above into appropriate openings in the arms of clamp clip 4, these nuts cooperating with tension screws 2 in such a way that counter blade 1 is pressed onto anvil 5. The arms of clamp clip 4 thus determine the position of counter blade 1 on the anvil.

By tightening tension screws 2 to a different extent than tension nuts 6, the arms of clamp clip 4 assume a slanted position, thereby displacing the counter blade. When the right-hand arm of clamp clip 4 as shown in FIG. 1 is raised vertically in the direction of arrow F, this causes displacement of counter blade 1 in the direction of arrow $F_1$, at the same time moving the left-hand arm of clamp clip 4 as shown in FIG. 1 somewhat downward. Conversely, when the arm of clamp clip 4 shown on the left in FIG. 1 is raised in the direction of arrow F', this causes counter blade 1 to be displaced in the opposite direction following arrow F'', so that the gap between counter blade 1 and path of rotation 11 of the cutting blades can thus be adjusted sensitively, quickly and without great effort.

The inventive chopping arrangement thus greatly facilitates the adjustment of the counter blade with respect to the known arrangements, since simple operation of the tension screws and tension nuts using an extended box wrench and in one procedural step allows for precise adjustment of the cutting gap.

We claim:

1. A chopping arrangement for a chopper, in particular a drum chopper having a chopping drum with several cutting blades spaced apart along its periphery which are attached to at least one rotating round anchor plate of the drum and cooperate with a counter blade having an adjustable position for chopping a stream of material fed between a gap between the cutting blades and counter blade, wherein the counter blade has longitudinal structure with mounting positions at each end, means clamping the counter blade at each said mounting position against a horizontally oriented stationary anvil with planar side walls, with an essentially U-shaped clamp clip which presses it against a horizontal surface of the anvil by means of tension screws fastened to the clamp clip and cooperating with tension adjusting nuts, extensions to the two arms of the clamp clip comprising articulation pieces having a convex side lying against the planar side walls of the anvil at only one point thereby to permit vertical displacement of one arm of the clamp clip by adjusting its nut to cause a corresponding, essentially horizontal displacement of the counter blade on said anvil to adjustably change the cutting gap between the blades.

2. A chopping arrangement as in claim 1, including framework wherein the tension screws are inserted from below through holes defined in the middle of the two articulation pieces and of the two arms of the clamp clip and the tension adjusting nuts are inserted into holes in the middle of the two arms of the clamp clip from above and extend upwardly far enough into the U-shaped clamp clip so as to be accessible from above the clamp clip by means of a box wrench.

* * * * *